United States Patent [19]

Peyroux

[11] Patent Number: 5,168,622
[45] Date of Patent: Dec. 8, 1992

[54] DEVICE FOR HOLDING AND/OR AUTOMATIC ASSEMBLY OF PARTS, HAVING TOOL-CARRYING ARMS MOUNTED ON A SUPPORT UNIT

[75] Inventor: Jean-Daniel Peyroux, Meudon, France

[73] Assignee: Regie Nationale des Usines Renault SA, Boulogne Billancourt, France

[21] Appl. No.: 696,022

[22] Filed: May 6, 1991

[30] Foreign Application Priority Data

May 4, 1990 [FR] France .................. 90 05678

[51] Int. Cl.⁵ .................. B23Q 17/00; B23P 21/00
[52] U.S. Cl. .................. 29/709; 29/714; 901/1
[58] Field of Search .................. 29/709, 33 K, 33 R, 29/714; 414/730, 737; 901/1, 6, 9, 40

[56] References Cited

U.S. PATENT DOCUMENTS

| | | | |
|---|---|---|---|
| 2,755,538 | 7/1956 | Kirsch | 29/709 |
| 3,570,101 | 3/1971 | Stead | 29/709 X |
| 4,510,683 | 4/1985 | Fedde et al. | 25/709 X |
| 4,790,069 | 12/1988 | Maruyama et al. | 29/709 X |
| 4,852,237 | 8/1989 | Tradt et al. | 29/709 X |

*Primary Examiner*—Timothy V. Eley
*Attorney, Agent, or Firm*—Oblon, Spivak, McClelland, Maier & Neustadt

[57] ABSTRACT

Device that makes possible the holding and/or automatic assembly of parts includes tool-carrying arms (40), fluid power circuits that actuate these tools, and control circuits for these power circuits. A support unit (10) has arms (40) mechanically fastened thereto. A fluid distributor (30) is mounted on the support unit, a part of the power and control circuits of the arms being incorporated into the support unit, the other part being extended in the arms.

10 Claims, 4 Drawing Sheets

DEVICE FOR HOLDING AND/OR AUTOMATIC ASSEMBLY OF PARTS, HAVING TOOL-CARRYING ARMS MOUNTED ON A SUPPORT UNIT

BACKGROUND OF THE INVENTION

1. Field of the Invention

This invention relates to a device that makes possible the holding and/or automatic assembly of parts, and more particularly, of sheet metal parts for motor vehicles.

2. Description of the Related Art

Known assembly devices are produced on demand, i.e., a design of a device is made for each new assembly operation. These assembly devices comprise arms that each, generally, supports a positioning, tightening or forming tool, and each such tool is directly connected to a control device by fluid intake pipes. This control device contains control elements (e.g., a computer) and the power elements (e.g., pumps, cylinders), and it is generally installed on the floor. All these pipes are very troublesome during the movement of the arms, because they limit their freedom of movement.

SUMMARY OF THE INVENTION

This invention has as an object to eliminate as much as possible any reduction in freedom of movement due to the fluid power intake pipes and control circuits, and this object is attained by using a support unit on which all the arms are suspended, the power and control circuits being installed in the support unit and in the arms.

This invention carries out the above object by use of a device that makes possible the holding and/or automatic assembly of parts, the device comprising tool-carrying arms, fluid power circuits that actuate these tools, and control circuits of these power circuits, including a support unit to which the arms are mechanically fastened, at least one fluid distributor mounted on the support unit, a part of the power and control circuits of the arms being incorporated into the support unit, the other part being extended in the arms.

The control circuits are electric circuits that provide the control of the tools and slide valves of the distributor.

The power circuits and control circuits are connected to outside pipes by at least one removable connector fastened to the support unit. The removable connector or connectors are fastened to the periphery of the support unit, between two arms.

Preferably, this device includes a plate installed between the support unit and the distributor or distributors in the direction of fluid flow, this plate comprising internal ducts which constitute a part of the fluid power circuits.

This plate has an electric terminal block that provides the internal connection for the electric circuits controlling the tools and slide valves of the distributor.

Each arm comprises inside passages which constitute a part of the fluid power circuits. Each arm also comprises a central passage in which electric connections are installed, and/or external passages in which electric connections are installed, all these electric connections constituting a part of the electric control circuits.

BRIEF DESCRIPTION OF THE DRAWINGS

An assembly device according to the invention is described below by way of example and with reference to the accompanying drawings.

DETAILED DESCRIPTION OF THE PREFERRED EMBODIMENTS

Figure 1:
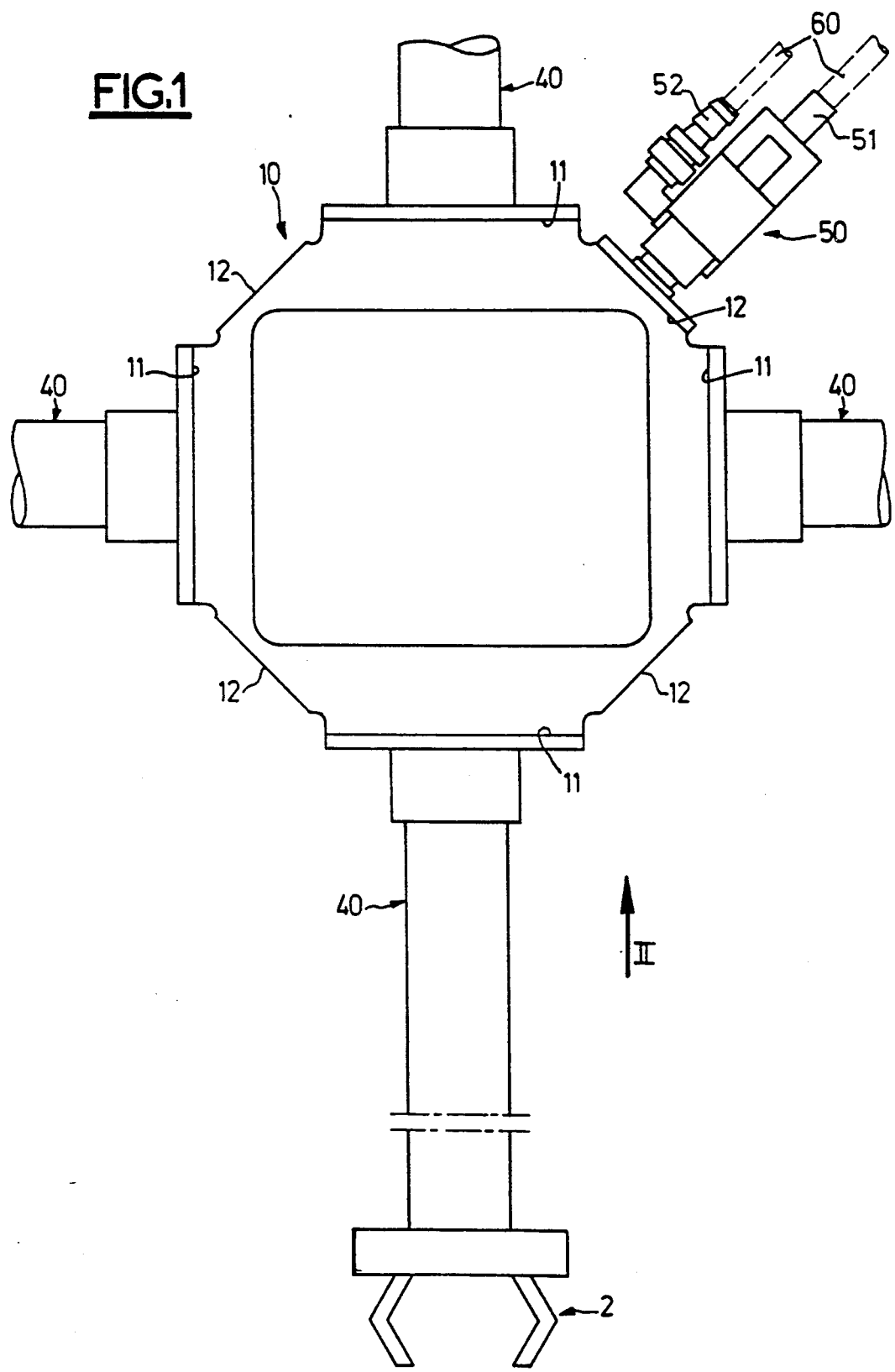
FIG. 1 shows a top view of the device according to the invention, showing at least one tool.

Shown in FIG. 1 is a support unit 10 which has four faces 11 on each of which an arm 40 is mounted, and four faces 12 on each of which a removable connector 50 may be mounted, only one of these connectors being so mounted in this embodiment. Each arm 40 is equipped with a hydraulic or pneumatic tool 2 which, in this case, is a clamp. The other tools, installed at the ends of the other arms 40, are not shown. Each removable connector 50 is fed from the outside by pipes 60. This connector 50 comprises, for example, a connector part 51 which is an electric intake and a connector part 52 which is a fluid power intake.

Figure 2:
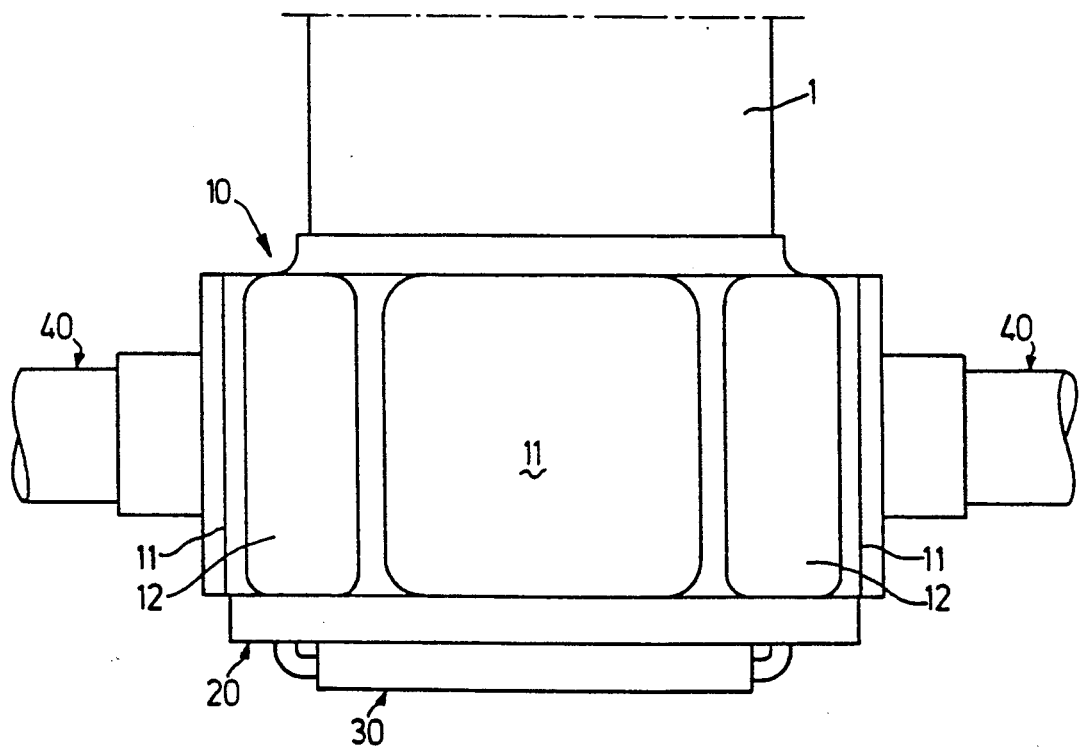
FIG. 2 shows a view along arrow II of FIG. 1, the tool having been withdrawn.

Shown in FIG. 2 is support unit 10 provided with two tool-carrying arms 40, a plate 20 and a distributor 30. Plate 20 is a fluid distribution plate and distributor 30 is fastened to this distribution plate.

The device is mounted at the end of a column 1. Of course, this device could be mounted on a mobile head such as a head of a robot.

Figure 3:
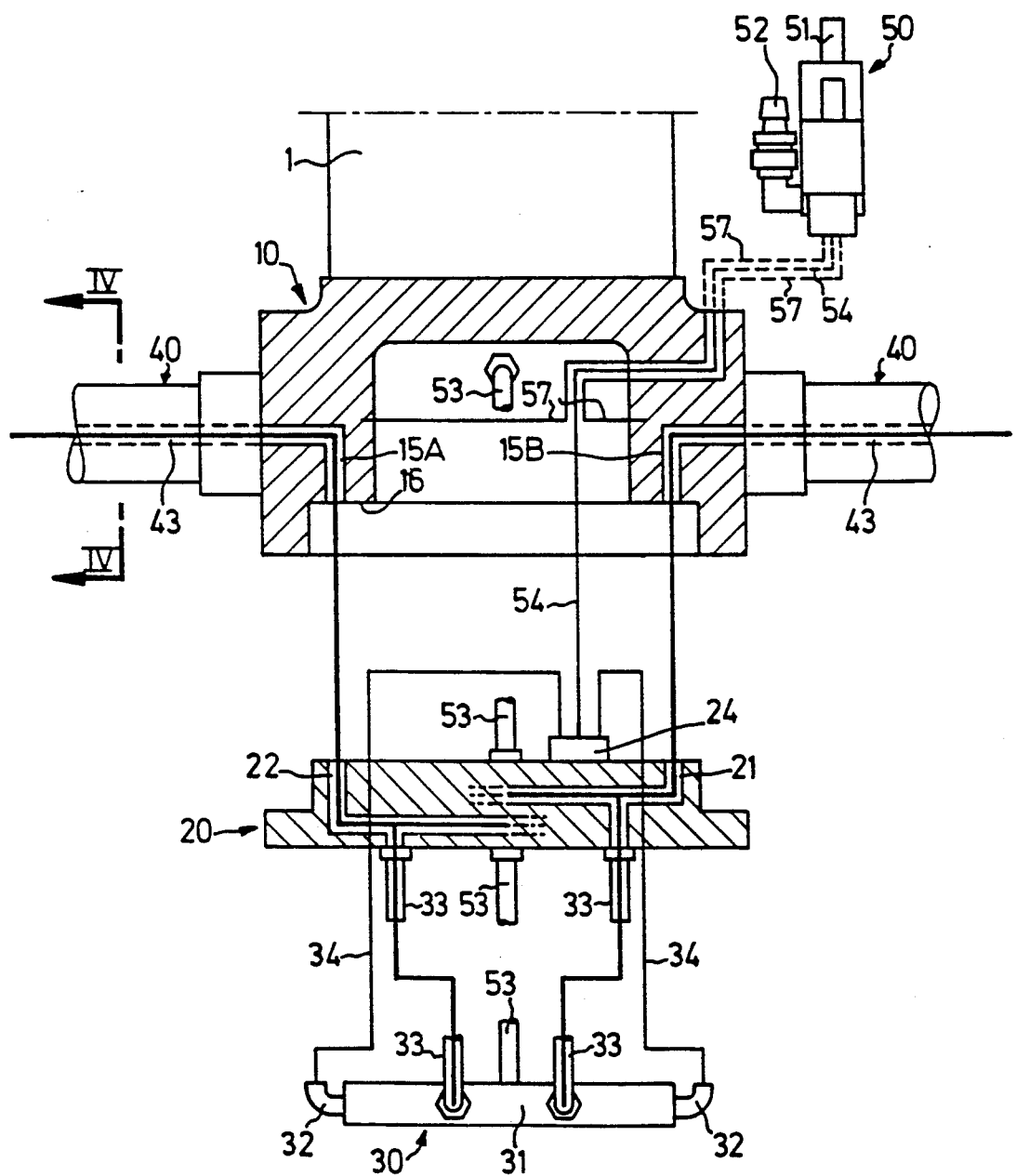
FIG. 3 shows a schematic and exploded view of FIG. 2.

FIG. 3 shows an exploded view of FIG. 2 in which column 1, support unit 10, plate 20, distributor 30 and two arms 40 are also shown. This figure also schematically shows a removable connector 50 including an electric connector part 51 and a fluid connector part 52.

Support unit 10 is designed in a sturdy and rigid way, because it carries the arms.

With reference to the fluid circuits, support unit 10 is passed through by a pipe 53 connected to connector part 52. It also has orifices 15a, 15b making possible the fluid feeding of the arms.

Plate 20, installed in bore 16 of the unit 10, comprises pipes 21, 22 that provide the distribution of the fluid from the connector 50. This plate 20 is passed through by pipe 53 which feeds distributor 30 directly. The pipes 21, 22 in plate 20 can be internal ducts which constitute part of a sort of fluidic "printed circuit". Such a plate can be obtained, for example, by gluing together several grooved layers (depending on the number of sequences), the grooves and adjacent adhered plates defining the ducts. The printed circuit is selected as a function of the tools and of the functions that it is desired to give to these tools. The plate is interchangeable for modularity. Of course, corresponding pipes and printed circuits are provided for connecting any other connectors 50 to their respective arms.

Distributor 30 comprises a central body 31 equipped with slide valves (not shown) for controlling fluid flow and two pipes 33 that provide the feeding of two of the arms 40 via the plate 20.

Figure 4:
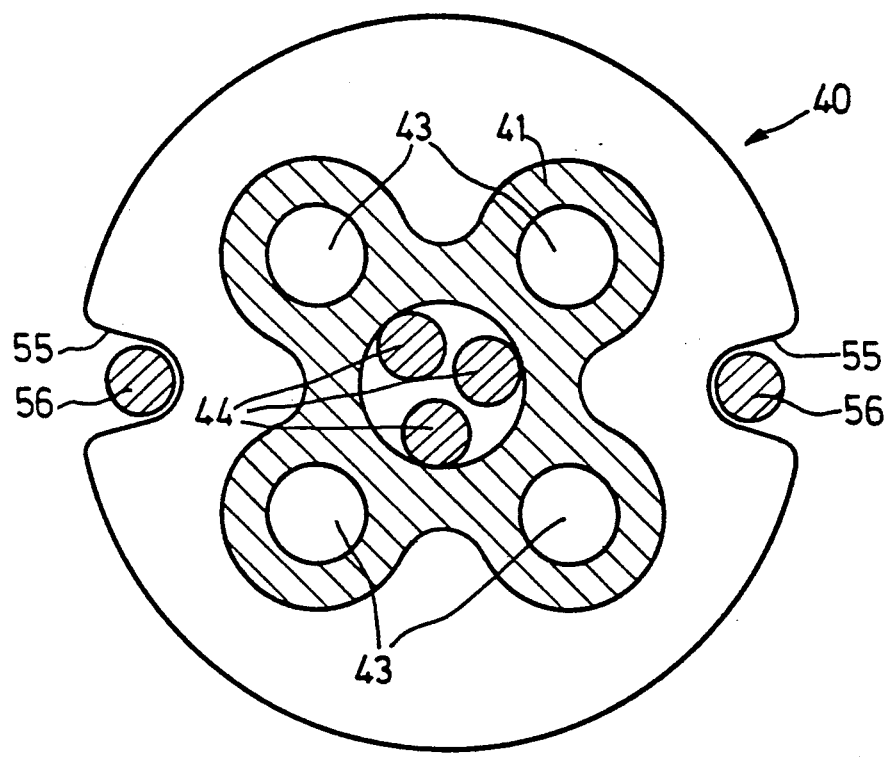
FIG. 4 shows a section of an arm along section line IV of FIG. 3.

Each arm, as can be seen in FIG. 4, comprises four internal passages 43 that provide the transmission of the fluid to the tools.

With reference to the electric circuits, an electric connection 54 coming from connector part 51 passes through unit 10 and is connected to a terminal block 24 of plate 20. Electric connections 34 connect terminal block 24 to electric terminals 32 of distributor 30 for control of the valves therein. Each arm, as can be seen in FIG. 4, has a central passage through which go three electric connections 44 and in recesses 55, two electric connections 56.

These electric connections 44 and 56, which are part of the electric control circuit, are connected at one end to an electric connection 57 connected to electric connector part 51 and, at the other end, to sensors or to motors installed at the end of the arms, near the tools.

This modular device can be the object of multiple applications, it can, for example, be fastened to a stationary base in relation to the floor; be fastened to any type of manipulator or extractor, for the handling of sheet metal parts of all types, on press lines or on assembly lines; serve as a control pattern for assembly mountings; serve as support on which various parts are positioned to assure their mutual assembly or their assembly on another part; be associated with one or more tools (suction means, welding tongs, gun for gluing, for welding of bolts or nuts, for finishing, etc.); carry parts that are held geometrically referenced in relation to these geometric references; be equipped with a function sequencer (tightening, loosening, welding, drilling, etc.); be coupled automatically to its support (stationary or manipulating); be coupled automatically with accompanying modular elements (tool-carrier, tightening element-carrier, etc.); be equipped with devices for transmitting and receiving data connected to the control box; be automatically identifiable.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. Device for holding and/or automatic assembly of parts, comprising:
   a support unit and carrying tools;
   a plurality of tool carrying arms mounted to said support unit;
   at least one fluid distributor mounted on the support unit; and
   power and control circuits extending between said support unit and corresponding tool carried by said arms, a part of each of said power and control circuits being incorporated into the support unit and another part of each of said power and control circuits being incorporated into one of said arms.

2. Device according to claim 1 wherein each of said power and control circuits is incorporated into said fluid distributor.

3. Device according to claim 2, wherein said distributor includes fluid flow control valves, and wherein the control circuits comprise electric circuits that control the valves.

4. Device according to claim 3 including a plate installed between said support unit and said distributor, said plate comprising internal ducts which constitute a part of said power circuits.

5. Device according to claim 4, wherein said plate includes an electric terminal block for said control circuits.

6. Assembly device according to claim 3, wherein each said arm comprises internal passages which constitute a part of the power circuits.

7. Assembly device according to claim 6, wherein each said arm comprises a central passage in which electric connections are installed.

8. Assembly device according to claim 7, wherein each said arm comprises external passages in which electric connections are installed and that comprise a part of the control circuits.

9. Device according to claim 2, including at least one removable connector fastened to said support unit and connected to said fluid power circuits and said electric control circuits, whereby the fluid power circuits and the electric control circuits may be connected to outside pipes.

10. Device according to claim 9, wherein the at least one removable connector is fastened to the periphery of the support unit between two of said arms.

* * * * *